United States Patent [19]

Dobreski et al.

[11] Patent Number: 4,804,564

[45] Date of Patent: * Feb. 14, 1989

[54] PLASTIC BAGS OF BLENDS OF LINEAR ETHYLENE POLYMERS AND AROMATIC POLYMERS

[75] Inventors: David V. Dobreski; Bruce E. Nattinger, both of Fairport, N.Y.

[73] Assignee: Mobil Oil Corporation, New York, N.Y.

[*] Notice: The portion of the term of this patent subsequent to Apr. 1, 2003 has been disclaimed.

[21] Appl. No.: 86,221

[22] Filed: Aug. 13, 1987

Related U.S. Application Data

[63] Continuation of Ser. No. 771,965, Sep. 3, 1985, abandoned, which is a continuation-in-part of Ser. No. 685,583, Dec. 24, 1984, Pat. No. 4,579,912, which is a continuation-in-part of Ser. No. 553,901, Nov. 21, 1983, abandoned, and a continuation-in-part of Ser. No. 676,979, Nov. 30, 1984, abandoned.

[51] Int. Cl.$^4$ .......................... C08J 5/18; C08K 3/36; C08L 23/18; B65D 30/02
[52] U.S. Cl. .................................. 428/35.5; 525/240; 524/528; 383/7; 383/8; 383/37; 206/527
[58] Field of Search ............................ 428/35; 525/240

[56] References Cited

U.S. PATENT DOCUMENTS 3,274,328  9/1966  Davis ................................. 525/240
3,894,117  7/1975  Agowri et al. ...................... 525/240
3,993,718  11/1976  Bontinck et al. ................... 525/931
4,255,531  3/1981  Arbit ................................... 525/237
4,260,565  4/1981  D'Amico et al. ................... 525/931
4,386,188  5/1983  Granciv et al. ...................... 525/96
4,579,912  4/1986  Canterino et al. ................. 525/240

FOREIGN PATENT DOCUMENTS 56-38338  4/1981  Japan .

OTHER PUBLICATIONS

Chemicalweek, 2/82, "A Better Syrene ... ", pp. 42–45.
Package Engineering, 2/80, "New Polyethylenes", pp. 39–40.
Plastics World, 12/79, "New Materials", p. 86.

*Primary Examiner*—Carman J. Seccuro
*Attorney, Agent, or Firm*—Alexander J. McKillop; Charles J. Speciale

[57] ABSTRACT

Plastic bags are made from linear ethylene homopolymer or linear low density copolymers (LLDPE) blended with up to about 10 weight percent of an aromatic polymer, e.g., polystyrene or poly(para-methylstyrene), to improve the ease of opening the bags by reducing the blocking tendency of the film. Although ease of opening is improved the aromatic polymer does not adversely affect the other physical properties of the bag, such as MD tear strength and stiffness, but improves them.

13 Claims, No Drawings

PLASTIC BAGS OF BLENDS OF LINEAR ETHYLENE POLYMERS AND AROMATIC POLYMERS

CROSS REFERENCE TO RELATED APPLICATIONS

This is a continuation of copending application Ser. No. 771,965, filed on Sept. 3, 1985, now abandoned, which is a continuation-in-pat of copending application Ser. No. 685,583, filed Dec. 24, 1984, now U.S. Pat. No. 4,579,912; which is a continuation-in-part of Ser. No. 553,901, filed Nov. 21, 1983, abandoned; and a continuation-in-part of Ser. No. 676,979, filed Nov. 30, 1984, abandoned.

BACKGROUND OF THE INVENTION

Linear low and medium density polyethylene copolymers (LLDPE), and linear high density polyethylene (HDPE) are known materials which are widely commercially available. LLDPE is also described in U.S. Pat. No. 4,076,698 which is incorporated herein by reference. A commercially important use of LLDPE and of HDPE is in making bags which are conventionally prepared from films by blown film extrusion. Because of the availability of polymers having excellent physical properties, such as tensile strength, the trend has been to reduce the gauge of the film used for economic reasons. Such bags even in film gauge of less than 1 mil have generally satisfactory properties but often are difficult to open, particularly with the thinner gauge films. In accordance with this invention, bag opening characeristics can be improved by blending HDPE or LLDPE with aromatic polymers such as polystyrene or poly(para-methylstyrene). It has been found that the aromatic polymer acts unexpectedly as an antiblocking agent and that blocking is one of the factors which contributes to difficulty in opening thin gauge bags.

SUMMARY OF THE INVENTION

This invention relates to bags made from films comprising blends of linear ethylene polymers and small amounts of aromatic polymers such as polystyrene or poly(para-methylstyrene). Another aspect of the invention relates to a method of improving the handling of blown films made from LLDPE polymers by incorporating the aromatic polymer in the bag making process.

DETAILED DESCRIPTION OF THE INVENTION

In accordance with this invention, the characteristics of bags made from ethylene polymers, particularly from HDPE, LLDPE or mixtures thereof can be improved by blending up to about 10 weight percent, preferably up to about 8 weight percent, and most preferably between about 3 and 8 weight percent of a thermoplastic aromatic polymer.

The linear ethylene polymers which are suitable for use in this invention are those now commercially prepared by low pressure techniques. But development is active in the preparation of linear copolymers under high pressure with coordination catalysts and the like. Such linear polymers are also suitable for use in this invention. Many suitable linear ethylene polymers are commercially available. Particularly suitable are LLDPE resins which are copolymers of ethylene and higher olefins, particularly 1-butene, 1-hexene, and 1-octene. These LLDPE copolymers generally have a density of between 0.90 and 0.94, preferably between 0.9 and 0.93.

Polystyrene and poly(para-methylstyrene) resins are particularly suitable as the aromatic polymer which is blended with the ethylene polymer. Polymers in which the aromatic monomer is the predominant constituent, such as high impact polystyrene and styrene copolymers are also suitable. The best tear strength is obtained with blends in which the linear ethylene polymer itself has good tear properties. Such blends result in films with good tear and impact properties, and the higher modulus characteristic of a higher density LLDPE film.

The linear ethylene polymer can be blended with other compatible polymers providing that the linear polymer is the major constituent of the blend. For example, LDPE high pressure polymer is suitable in such blends.

Compatibilizers can be used in small amounts up to about 2 weight percent of the composition but are not necessary. Suitable compatibilizers include block copolymers of styrene-ethylene propylene-styrene (Kraton G), block copolymers of styrene and ethylene (Shelvis) and ethylene propylene copolymers (Vistalon 3707). For purposes of ease of blending and control on a commercial scale it is preferred that the LLDPE and the aromatic polymer be the sole polymeric components.

The resin blends and bags are made in the conventional manner. Preferably, the bags are made from films obtained by blown film extrusion using conventional techniques to obtain films which are generally from about 0.2 l to 5 mils in thickness.

This invention finds particular utility in the production of bags having a thin gauge which are commonly dispensed from rolls in supermarket produce sections, for example. It is a common experience to find these bags difficult to open and this difficulty is reduced by using the polymer blends of this invention. But the invention is by no means limited to bags supplied on rolls. It is also advantageous in the production of the larger bags usually having handles and gussetts which are in widespread use at supermarket checkout counters. These bags are commonly supplied in packs of 50 or more bags attached to a tear-off tab fitted to a dispenser device for holding the bag open during loading. Bags of this type are disclosed in U.S. Pat. No. 4,165,832 which is incorporated herein by reference.

As previously indicated blending of the LLDPE resin and the aromatic polymer is done in the conventional manner. Blending can be accomplished by melting the polymers into pellets for future extrusion or by feeding a mixture of the two polymers directly to the extruder. The latter may be preferable in commercial operations because the separate operation of melt blending and its attendant expense is eliminated.

Antiblock agents such as diatomaceous earth (silica) are commonly used in bag compositions. These agents often have deleterious effects on the physical properties of bag films. It is an anticipated advantage of this invention that conventional anti-block agent can be reduced or eliminated and replaced in whole or in part with the aromatic polymer. The aromatic polymer, when used in proper amounts has a beneficial effect on important physical propeties such as MD tear strength and stiffness, and provides the unexpected improvement in antiblock characteristics contributing to easier opening.

In addition to the improvements apparent in the final bags due to the incorporating of aromatic polymer, improvements in processing have been noted. For example, in post-gussetting operations in which a tube blown film is flattened and reblown to introduce gussets difficulty is often encountered in the reblowing step due to blocking of the films causing non-uniform gussets and other problems. These problems are reduced by using the blends of this invention.

The following non-limiting examples are illustrative of this invention. Unless otherwise noted all parts are by weight.

EXAMPLES 1-2

A compounded blend of 95% LLDPE (ethylene-1-hexene copolymer, MI 0.7, density 0.922) and 5% polystyrene (Mobil PS 1240) was produced by feeding both materials into an intensive mixer (Bolling Mill) at the correct ratio, melting and mixing both polymers together such that an intimate mixture was obtained, then feeding the molten mass to a pelletizer, thus producing pellets. These pellets were cooled and stored several weeks. The pellets were subsequently made into film suitable for producing grocery sacks by the blown film process. Similarly produced pellets of the LLDPE without polystyrene were also made into film in an identical manner.

In a second run pellets of the identical polystyrene were blended with pellets of the LLDPE in the blown film extruder hopper in the proper ratio and immediately made into film suitable for grocery sacks. Films from both experiments were tested for 1% secant modulus (stiffness) and for tensile impact (spittiness).

| Example | Film | Blend Method | MD 1% Secant Modulus (psi) | TD Tensile Impact (ft-lb) |
|---|---|---|---|---|
| C-1. | 100% LLDPE | Melt | 37000 | 0.46 |
| 1. | 95% LLDPE/ 5% PS1240 | Melt | 48500 | 0.52 |
| | % increase (1) vs (C-1) | | 31 | 15 |
| C-2. | 100% LLDPE | Dry | 46200 | 0.27 |
| 2. | 95% LLDPE/ 5% PS1240 | Dry | 55000 | 0.47 |
| | % increase (2) vs (C-2) | | 19 | 76 |

The bags made in accordance with this invention are demonstrably easier to open than the corresponding bags containing no aromatic polymer. The ease of opening has been associated at least in part to a reduced tendency to block in standard quantitative blocking tests. The increased stiffness of the blends is also believed to contribute to the ease of opening.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

We claim:

1. A thermoplastic bag made from a film containing inorganic antiblock agent and, as the sole polymeric constituents, a linear homopolymer of ethylene or a linear copolymer of ethylene and a higher olefin having at least 4 carbon atoms, and 0.1 to about 10 weight percent of a thermoplastic polymer of an aromatic hydrocarbon selected from the group consisting of polystyrene and poly(para-methylstyrene) in an amount sufficient to equal or improve the antiblock chracteristics which are obtained by using a larger amount of said inorganic antiblock agent in the absence of said thermoplastic polymer of an aromatic hydrocarbon.

2. A roll of flattened ungussetted bags according to claim 1.

3. A bag-pack of gussetted bags having handles, according to claim 1.

4. A roll of flattened gussetted bags according to claim 1.

5. A bag-pack of ungussetted bags having handles, according to claim 1.

6. The bag of claim 1 in which said thermoplastic polymer of an aromatic hydrocarbon is polystyrene.

7. The bag of claim 1 in which said low pressure linear ethylene polymer is a copolymer of ethylene and a higher olefin having 4-8 carbon atoms and a density of less than 0.94.

8. The bag of claim 1 in which said linear ethylene polymer is a copolymer of ethylene and a higher olefin having 4-8 carbon atoms and a density of less than 0.94 and said polymer of an aromatic hydrocarbon is polystyrene.

9. The bag of claim 1 in which said linear ethylene polymer is a copolymer of ethylene and a higher olefin having 4-8 carbon atoms and a density of less than 0.94 and said polymer of an aromatic hydrocarbon is poly(para-methyl styrene).

10. The bag of claim 1 in which said polymer of an aromatic hydrocarbon comprises up to 10 percent by weight of the film.

11. The bag of claim 1 in which said polymer of an aromatic hydrocarbon comprises up to 8 percent by weight of the film.

12. The bag of claim 1 in which said inorganic antiblock agent is silica.

13. The bag of claim 1 in which said polymer of styrene comprises from 0.1 to 8 weight percent of the film.

* * * * *